United States Patent
Keshavan et al.

(10) Patent No.: US 10,364,701 B2
(45) Date of Patent: Jul. 30, 2019

(54) CMAS BARRIER COATING FOR A GAS TURBINE ENGINE HAVING A REACTIVE MATERIAL THAT REACTS WITH A LAYER OF ENVIRONMENTAL CONTAMINANT COMPOSITIONS AND METHOD OF APPLYING THE SAME

(71) Applicant: General Electric Company, Schenectady, NY (US)

(72) Inventors: Hrishikesh Keshavan, Watervliet, NY (US); Byron Andrew Pritchard, Jr., Loveland, OH (US); Shankar Sivaramakrishnan, Niskayuna, NY (US); Julie Marie Chapman, West Chester, OH (US); Ambarish Jayant Kulkarni, Glenville, NY (US); Bernard Patrick Bewlay, Niskayuna, NY (US); Mehmet M. Dede, Liberty Township, OH (US); Larry Steven Rosenzweig, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 285 days.

(21) Appl. No.: 15/370,447

(22) Filed: Dec. 6, 2016

(65) Prior Publication Data
US 2018/0154392 A1    Jun. 7, 2018

(51) Int. Cl.
*F01D 25/00* (2006.01)
*C23C 24/04* (2006.01)
(Continued)

(52) U.S. Cl.
CPC .............. *F01D 25/005* (2013.01); *C23C 4/11* (2016.01); *C23C 24/04* (2013.01); *F01D 5/288* (2013.01);
(Continued)

(58) Field of Classification Search
CPC ...... F01D 25/005; F01D 5/288; F01D 11/003; F01D 11/08; F01D 11/122; F01D 25/007;
(Continued)

(56) References Cited

U.S. PATENT DOCUMENTS

| 6,010,746 A | 1/2000 | Descoteaux et al. |
| 6,465,090 B1 * | 10/2002 | Stowell ................. C04B 41/009 |
| | | 416/241 B |

(Continued)

FOREIGN PATENT DOCUMENTS

WO    2015116300 A2    8/2015

OTHER PUBLICATIONS

Rai et al., CMAS-Resistant Thermal Barrier Coatings (TBC), "International Journal of Applied Ceramic Technology", vol. 7, Issue 5, pp. 662-674, May 11, 2009.

(Continued)

*Primary Examiner* — Kenneth J Hansen
*Assistant Examiner* — Benjamin Doyle
(74) *Attorney, Agent, or Firm* — Dority & Manning, P.A.

(57) ABSTRACT

A coated component, along with methods of its formation, restoration, and use, is provided. The coated component may include a substrate defining a surface; a thermal barrier coating on the surface of the substrate; a layer of environmental contaminant compositions (e.g., CMAS) on the thermal barrier coating; and a chemical barrier coating on the layer of environmental contaminant compositions.

20 Claims, 2 Drawing Sheets

(51) Int. Cl.
*C23C 4/11* (2016.01)
*F01D 5/28* (2006.01)

(52) U.S. Cl.
CPC ...... *F05D 2300/15* (2013.01); *F05D 2300/21* (2013.01); *F05D 2300/2112* (2013.01); *Y02T 50/672* (2013.01); *Y02T 50/6765* (2018.05)

(58) Field of Classification Search
CPC .. C23C 24/04; C23C 8/00; C23C 4/11; C23C 28/30; C23C 28/321; C23C 28/3215; C23C 28/042; C23C 28/3455; F05D 2300/15; F05D 2300/21; F05D 2300/2112; B05D 1/12; B05D 5/005; B05D 7/14; B05D 3/00
USPC ....... 416/241 R; 427/331, 333, 372.2, 376.1, 427/419.3, 427, 454
See application file for complete search history.

(56) References Cited

U.S. PATENT DOCUMENTS

| | | |
|---|---|---|
| 8,221,825 B2 | 7/2012 | Reitz et al. |
| 8,356,482 B2 | 1/2013 | Duval et al. |
| 8,470,460 B2 | 6/2013 | Lee |
| 8,758,502 B2 | 6/2014 | Nienburg et al. |
| 9,096,736 B2 | 8/2015 | Tanaka et al. |
| 2003/0221315 A1 | 12/2003 | Baumann et al. |
| 2007/0063351 A1* | 3/2007 | Duda ............ C23C 4/02 257/758 |
| 2009/0169752 A1 | 7/2009 | Fu et al. |
| 2009/0252985 A1 | 10/2009 | Nagaraj et al. |
| 2010/0136349 A1* | 6/2010 | Lee ............ C04B 41/009 428/446 |
| 2016/0273114 A1* | 9/2016 | Hongoh ............ C23C 24/10 |

OTHER PUBLICATIONS

Wu et al., Evaluation of Plasma Sprayed YSZ thermal Barrier Coatings with the CMAS Deposits Infiltration using Impedance Spectroscopy, "Progress in Natural Science: Materials International", vol. 22, Issue 1, pp. 40-47, Feb. 2012.

Bilge et al., CAMS-Resistant Plasma Sprayed Thermal Barrier Coatings Based on Y2O3-Stabilized ZrO2 with Al3+ and Ti4+ Solute Additions, "Journal of Thermal Spray Technology", vol. 23, Issue 4, pp. 708-715, Apr. 2014.

* cited by examiner

CMAS BARRIER COATING FOR A GAS TURBINE ENGINE HAVING A REACTIVE MATERIAL THAT REACTS WITH A LAYER OF ENVIRONMENTAL CONTAMINANT COMPOSITIONS AND METHOD OF APPLYING THE SAME

FIELD OF TECHNOLOGY

The field of this disclosure is directed to a coating of a CMAS reactive ceramic material on top of a thermal barrier coating to improve its on-wing life and overall performance, along with methods of their formation.

BACKGROUND

Thermal barrier coatings ("TBC") are typically used in articles that operate at or are exposed to high temperatures. Aviation turbines and land-based turbines, for example, may include one or more components protected by the thermal barrier coatings. Under normal conditions of operation, coated components may be susceptible to various types of damage, including erosion, oxidation, and attack from environmental contaminants.

For turbine components, environmental contaminant compositions of particular concern are those containing oxides of calcium, magnesium, aluminum, silicon, and mixtures thereof; dirt, ash, and dust ingested by gas turbine engines, for instance, are often made up of such compounds. These oxides often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants can adhere to the hot thermal barrier coating surface, and thus cause damage to the thermal barrier coating. For example, CMAS can form compositions that are liquid or molten at the operating temperatures of the turbines. The molten CMAS composition can dissolve the thermal barrier coating, or can fill its porous structure by infiltrating the pores, channels, cracks, or other cavities in the coating. Upon cooling, the infiltrated CMAS composition solidifies and reduces the coating strain tolerance, thus initiating and propagating cracks that may cause delamination and spalling of the coating material. This may further result in partial or complete loss of the thermal protection provided to the underlying metal substrate of the part or component. Further, spallation of the thermal barrier coating may create hot spots in the metal substrate leading to premature component failure. Premature component failure can lead to unscheduled maintenance as well as parts replacement resulting in reduced performance, and increased operating and servicing costs.

However, routine maintenance of a TBC includes washing and reapplying the TBC material onto the component. Such operations require either engine disassembly or an engine wash process such that a new TBC can be applied onto the surface of the component(s). Such a disassembly processes, causes downtime in the engine leading to loss of service for extended periods of time. Alternatively, flushing the internal components of the engine with detergents and other cleaning agents can introduce other unwanted issues to the engine.

Therefore, a process is needed to extend the life of TBC coatings, especially for continued operation of the hot section components of a gas turbine engines, while avoiding any disassembly and/or cleaning processes.

BRIEF DESCRIPTION

Aspects and advantages will be set forth in part in the following description, or may be obvious from the description, or may be learned through practice of the invention.

A coated component is generally provided, along with methods of its formation, restoration, and use. In one embodiment, the coated component may include a substrate defining a surface; a thermal barrier coating on the surface of the substrate; a layer of environmental contaminant compositions (e.g., CMAS) on the thermal barrier coating; and a chemical barrier coating on the layer of environmental contaminant compositions.

A method is also generally provided for operating a gas turbine engine that includes such a coated component. For example, the method may include operating the engine to cause reaction between the layer of environmental contaminant compositions and the reactive material of the chemical barrier coating. During operation, a second layer of environmental contaminant compositions may then form on the chemical barrier coating after operating the engine, which may also react with the underlying chemical barrier coating.

A method is also generally provided for refreshing a thermal barrier coating having a layer of environmental contaminant compositions thereon. In one embodiment, a reactive material may be applied directly onto the layer of environmental contaminant compositions on the thermal barrier coating to form a chemical barrier coating.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
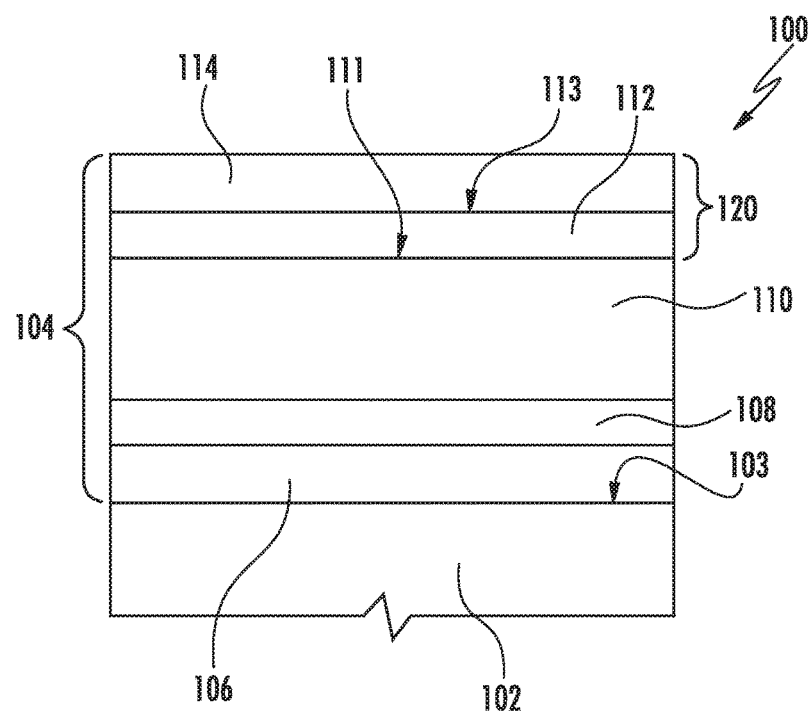
FIG. 1 shows an exemplary embodiment of a coated component having a chemical barrier coating on a layer of environmental contaminant compositions.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

As used herein, the term "fusion temperature" refers to the degree of temperature at which a substance starts to melt (i.e., the incipient melting point). Since these materials generally have a complex, multi-component range of compositions, this fusion temperature could be measurably lower than the temperature at which a single-phase liquid zone would be realized.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

A coated component is generally provided that includes a refreshed thermal barrier coating, along with methods of its application and use. The coated component generally has a coating system to protect the underlying material (e.g., underlying coating and/or surfaces) from undesired chemical interactions. The coating system generally includes a chemical barrier coating positioned on any layer of environmental contaminant compositions present on the surface of a thermal barrier coating ("TBC"). As used herein, the term "layer of environmental contaminant compositions" refers to a contamination layer formed during use of the component, and includes, for example, products formed by reaction of CMAS and the underlying TBC.

The chemical barrier coating generally protects the underlying TBC from CMAS attack by reacting with the existing layer of environmental contaminant compositions on its surface and/or by reacting with additional CMAS deposits formed on the chemical barrier coating after subsequent use of the component (e.g., after operation of an engine containing the component). Additionally, the chemical barrier coating can protect any bond coat, and particularly any thermally grown oxide on the bond coat, from CMAS attack, from reactive particle attack, or reactive layer attack. The chemical barrier coating is particularly useful on coating systems that include a thermal barrier coating after it has been used in service, and may include a plurality of surface-connected voids, such as cracks and porosity, which provides a path for CMAS attack, reactive particle attack, or a reactive layer attack.

Referring to FIG. 1, a coated component 100 is generally shown including a substrate 102 having a surface 103. In particular embodiments, the coated component 100 may be any article that is subject to service in a high-temperature environment, such as a component of a gas turbine assembly. Examples of such components include, but are not limited to, components that include turbine airfoils such as blades and vanes, and combustion components such as liners and transition pieces. Substrate 102, then, may be any material suitable for use in such applications, including but not limited to nickel-base superalloys, cobalt-base superalloys, and ceramic matrix composites.

As shown in FIG. 1, a coating system 104 is positioned on the surface 103 of the substrate 102. In the exemplary embodiment of FIG. 1, the coating system 104 includes a bond coating 106 on the surface 103, a thermally grown oxide layer 108 on the bond coating 106, and a TBC 110 is on the thermally grown oxide layer 108.

The bond coat 106 provides functionality (adhesion promotion and oxidation resistance, for example) similar to what such coatings generally provide in conventional applications. In some embodiments, bond coat 106 comprises an aluminide, such as nickel aluminide or platinum aluminide, or a MCrAlY-type coating well known in the art. These bond coats may be especially useful when applied to a metallic substrate 102, such as a superalloy. In other embodiments, bond coat 106 comprises a silicide compound or elemental silicon, which are often associated with ceramic-based substrates, such as silicon carbide-reinforced silicon carbide ceramic matrix composites (CMC's). The bond coat 106 may be applied using any of various coating techniques known in the art, such as plasma spray, thermal spray, chemical vapor deposition, ion plasma deposition, vapor phase aluminide or physical vapor deposition.

The bond coat 106 may have a thickness of about 2.5 µm to about 400 µm and may be applied as an additive layer to the substrate 102 or may be diffused into the substrate giving an inhomogeneous composition which is engineered to have a gradient in properties. However, it is noted that all coating layers within the coating system 104 can vary in thickness depending on location on the part.

A thermally grown oxide layer 108 is shown on the bond coating 106. Generally, the thermally grown oxide layer 108 includes an oxide of the material of the bond coating 106. For example, when the bond coating 106 includes silicon in its construction, the thermally grown oxide layer 108 may include a silicon oxide (e.g., silicon dioxide, etc.). Similarly, when the bond coating 106 includes aluminum in its construction, the thermally grown oxide layer 108 may include an aluminum oxide (e.g., $Al_2O$, $AlO$, $Al_2O_3$, etc., or mixtures thereof).

In certain embodiments, the thermally grown oxide layer 108 generally has a thickness of up to about 20 µm (e.g., about 0.01 µm to about 6 µm) and can be a natural product of thermal exposures during processing of subsequent layers or can be designed to be thicker by heat treating the part. The TGO layer may not be uniform dependent on the underlying bond coating 106, processing methods, and exposure conditions.

As shown, a TBC 110 may be over the bond coat 106 and TGO layer 108. The TBC 110 may be applied by any technique suitable for a given application, such as via air plasma spray techniques, suspension plasma spray and other thermal spray processes, physical- or chemical-vapor deposition techniques, etc. Although any suitable chemistry can be utilized for TBC 110, the TBC 110 may generally include a ceramic thermal barrier material in particular embodiments. For example, suitable ceramic thermal barrier coating materials include various types of oxides, such as aluminum oxide ("alumina"), hafnium oxide ("hafnia") or zirconium oxide ("zirconia"), in particular stabilized hafnia or stabilized zirconia, and blends including one or both of these. Examples of stabilized zirconia include without limitation yttria-stabilized zirconia, ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, gadolinia-stabilized zirconia, as well as mixtures of such stabilized zirconia. Similar stabilized hafnia compositions are known in the art and suitable for use in embodiments described herein.

In certain embodiments, thermal barrier coating 110 includes yttria-stabilized zirconia. Suitable yttria-stabilized zirconia may include from about 1 weight percent to about 20 weight percent yttria (based on the combined weight of yttria and zirconia), and more typically from about 3 weight percent to about 10 weight percent yttria. An example yttria-stabilized zirconia thermal barrier coating includes about 7% yttria and about 93% zirconia. These types of zirconia may further include one or more of a second metal (e.g., a lanthanide or actinide) oxide, such as dysprosia, erbia, europia, gadolinia, neodymia, praseodymia, urania, and hafnia, to further reduce thermal conductivity of the thermal barrier coating material. In some embodiments, the thermal barrier coating material may further include an additional metal oxide, such as, titania and/or alumina. For example, the thermal barrier coating 110 can be composed of 8YSZ, though higher $Y_2O_3$ concentrations can be utilized.

Suitable ceramic thermal barrier coating materials may also include pyrochlores of general formula $A_2B_2O_7$ where A is a metal having a valence of 3+ or 2+ (e.g., gadolinium, aluminum, cerium, lanthanum or yttrium) and B is a metal having a valence of 4+ or 5+ (e.g., hafnium, titanium, cerium or zirconium) where the sum of the A and B valences is 7. Representative materials of this type include gadolinium zirconate, lanthanum titanate, lanthanum zirconate, yttrium zirconate, lanthanum hafnate, cerium hafnate, and lanthanum cerate.

Thermal barrier coating 110 may include the ceramic thermal barrier coating material in an amount of up to 100 weight percent. In some embodiments, the thermal barrier coating 110 includes the ceramic thermal barrier coating material in a range from about 95 weight percent to about 100 weight percent and more particularly from about 98 weight percent to about 100 weight percent. The selected composition of coating 110 may depend upon one or factors, including the composition of the optional, adjacent bond coating layer 106 (if present), the coefficient of thermal expansion (CTE) characteristics desired for coating 110, and the thermal barrier properties desired for coating 110.

The thickness of thermal barrier coating 110 may depend upon the substrate or the component it is deposited on. In some embodiments, coating 110 has a thickness in a range of from about 25 micrometer (μm) to about 2000 μm. In some embodiments, coating 110 has a thickness in a range of from about 25 μm to about 1500 μm. In some embodiments, the thickness is in a range of from about 25 μm to about 1000 μm.

After use of the component 100, such as within a hot gas path of a gas turbine engine, a layer 112 of environmental contaminant compositions forms on a surface 111 of the TBC 110, as shown in FIG. 1. For example, the environmental contaminant compositions of include oxides of calcium, magnesium, aluminum, silicon, and mixtures thereof; dirt, ash, and dust ingested by gas turbine engines, for instance, are often made up of such compounds. As stated, these oxides often combine to form contaminant compositions comprising mixed calcium-magnesium-aluminum-silicon-oxide systems (Ca—Mg—Al—Si—O), hereafter referred to as "CMAS." At the high turbine operating temperatures, these environmental contaminants adhere to the hot surface 111 of the TBC 110 to form the layer 112.

As shown in the embodiment of FIG. 1, a chemical barrier coating 114 is formed directly on the layer 112 of environmental contaminant compositions. For example, the chemical barrier coating 114 may be formed on the layer 112 of environmental contaminant compositions without any pre-washing or any other pre-treatment step. That is, the formation process can be performed without the use of any aqueous or organic precursors. The chemical barrier coating 114 generally includes at least one protective agent that is reactive with the contaminant compositions of the layer 112. Without wishing to be bound by any particular theory, it is believed that protective agent(s) of the chemical barrier coating 114 are highly reactive to CMAS-type material, such that, at typical temperatures where CMAS is encountered in liquid form, the protective agent rapidly reacts with the CMAS to form a solid reaction product that itself is thermally and chemically stable in the presence of liquid CMAS, forming a solid-phase barrier against further CMAS attack to the underlaying layers (e.g., to the underlying TBC layer 110).

In particular embodiments, the "protective agent" includes a substance that is reactive with CMAS material. More particularly, a substance is considered suitable as a substance for use in the protective agent as described herein if the substance has the characteristic property. In certain embodiments, for instance, the protective agent may chemically react with a nominal CMAS liquid composition at atmospheric pressure to form a solid, crystalline product that is outside the crystallization field of this nominal CMAS composition. Such a solid crystalline product may have a higher melting temperature than the nominal CMAS composition so that it remains as a solid barrier to liquid infiltration.

For the purposes of this description, the term "nominal CMAS" refers to the following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for the substance's CMAS reactivity in a way that can be compared to the CMAS reactivity of other substances; use of this reference composition does not limit in any way the actual composition of ingested material that becomes deposited on the coating during operation which, of course, will vary widely in service.

If a given substance is capable of reacting with molten CMAS having the above nominal composition, thereby forming a reaction product that has a melting point higher than about 1200° C., is crystalline, and is outside the crystallization field of this nominal CMAS composition, then the substance may be useful in the protective agent as described herein. A material is outside the crystallization field of the nominal CMAS composition if it is not included in the set of crystalline phases that can be formed from combinations of the component oxides of the CMAS composition. Thus, a material that includes a rare-earth element, such as ytterbium, for instance, would be outside the crystallization field of the nominal CMAS composition because none of the component oxides of the nominal CMAS includes ytterbium. On the other hand, a reactive agent that exclusively employs one or more of the other components of the nominal CMAS composition, such as aluminum oxide, would not form a product outside the crystallization field of nominal CMAS. Use of a protective agent substance that promotes formation of reaction product with CMAS outside the crystallization field of the CMAS may result in faster reaction kinetics with CMAS under some circumstances, and if reaction kinetics can be accelerated, then ingress of molten CMAS prior to reaction and solidification desirably may be reduced.

In some embodiments, the protective agent includes a rare-earth oxide, that is, an oxide compound that includes a rare-earth element as one of its constituent elements. As used herein, the terms "rare-earth" and "rare-earth element" are used interchangeably, and encompass elements of the lanthanide series, yttrium, and scandium. For example, in some embodiments, the oxide includes lanthanum, neodymium, erbium, cerium, gadolinium, or combinations including any one or more of these. Certain complex oxides, that is, oxide compounds that include more than one metal element constituent, have been shown in some circumstances to provide comparatively high reactivity with liquid CMAS. In particular embodiments, the oxide is a complex oxide that includes a rare-earth element and a transition metal element, such as zirconium, hafnium, titanium, or niobium, along with combinations of these. Zirconates, hafnates, titanates, and niobates that include lanthanum, neodymium, cerium, and/or gadolinium are examples of such complex oxide. A particular example is gadolinium zirconate. For example, the protective agents may include, in particular embodiments, alpha-$Al_2O_3$, 55YSZ, $GdAlO_3$, $SrGd_2Al_2O_7$ ("SAG"), etc., and combinations thereof.

Figure 2:
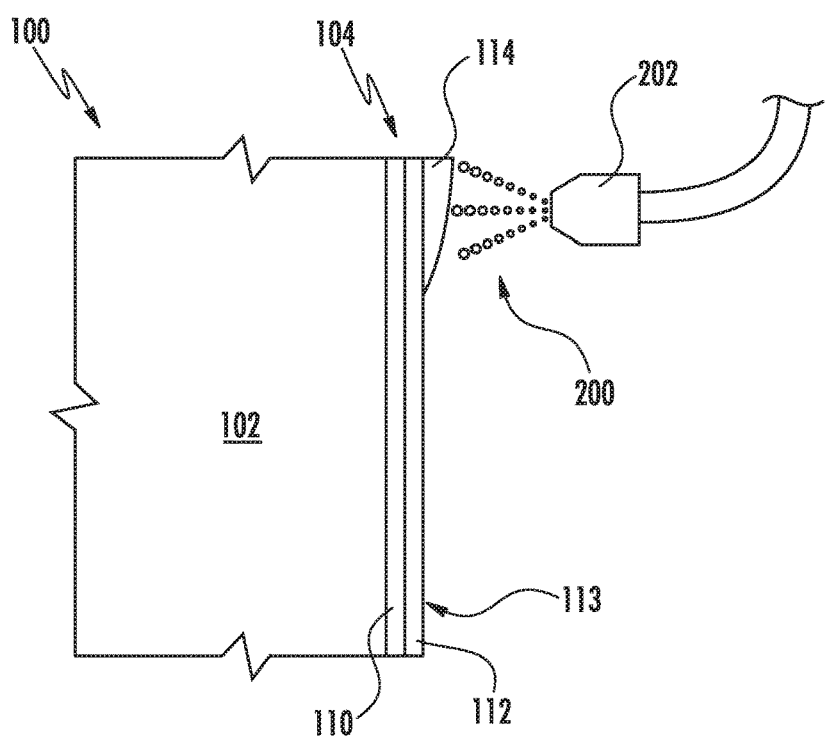
FIG. 2 shows an exemplary spray method for forming the chemical barrier coating on a layer of environmental contaminant compositions.
Figure 3:
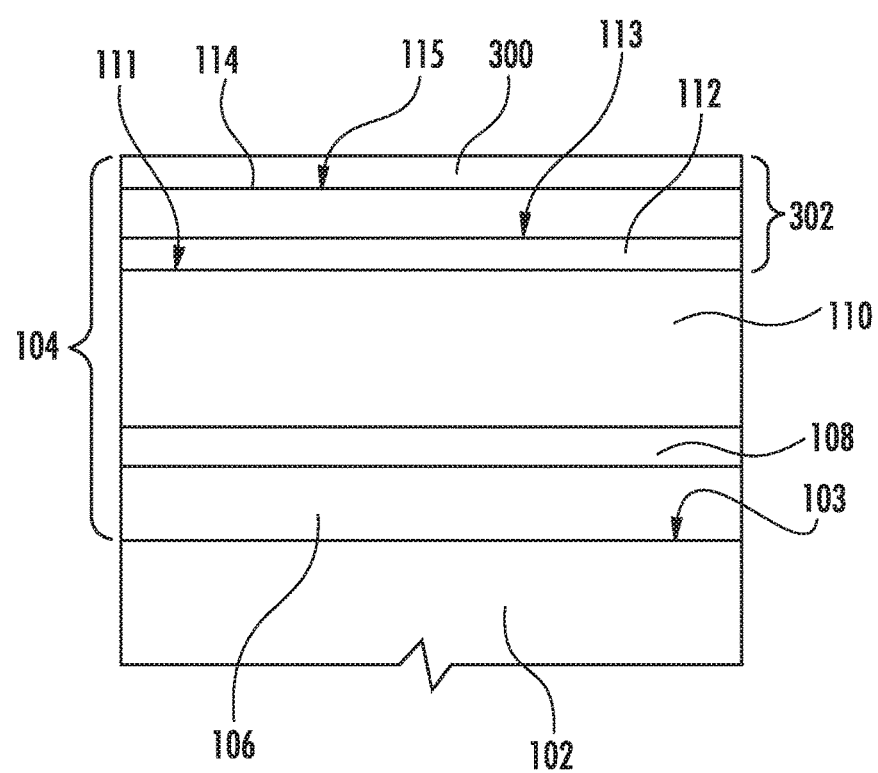
FIG. 3 shows an exemplary embodiment of a coated component having a second layer of environmental contaminant compositions formed on a coated component such as in FIG. 1.

The chemical barrier coating 114 can be formed via any suitable method. However, when performed in an on-wing restoration process (e.g., without dismantling of the turbine engine), certain practical restraints exist that inhibit the use of several traditional coating methods such as thermal spraying, flowing, dipping, etc. cannot be used. In particular embodiments, a more simple room temperature processing of the chemical barrier coating 114 can be performed, such as via spraying, brushing, rolling, etc. Referring to the embodiment of FIG. 2, a plurality of ceramic oxide particles 200 are shown being sprayed from a spray head 202 to form the chemical barrier coating 114 directly on the surface 113 of the layer 112. In one embodiment, the average particle size of the plurality of ceramic oxide particles 200 is less than the surface roughness ($R_A$) of the surface 111 of the TBC 110 such that the ceramic oxide particles 200 can fill the crevasses and valleys defined within the surface 111. In particular embodiments, the average particle size of the plurality of ceramic oxide particles 200 is about 90% of the surface roughness or less, such as about 1% to about 50% of the surface roughness (e.g., about 1% to about 30%). For example, if the TBC 110 is a EB-PVD coating having a surface roughness that is about 2 μm to about 2.5 μm, then the average particle size of the ceramic oxide particles 200 can be about 0.75 μm or less (e.g., about 0.1 μm to about 0.5 μm).

In particular embodiments, the ceramic oxide particles 200 can have an average particle size of about 0.1 μm to about 10 μm (e.g., about 0.5 μm to about 5 μm, such as about 1 μm to about 3 μm).

In one embodiment, the chemical barrier coating 114 has a microstructure formed according to its method of deposition and formation. This microstructure is not typical of any conventionally used TBC. For example, if sprayed onto the layer 112 in the form of ceramic oxide particles 200, the microstructure of the chemical barrier coating 114 is distinguished from other methods of formation (such as Air Plasma Spraying (APS), Electron Beam Physical Vapor Deposition (EBPVD), Suspension Plasma Spraying (SPS) or Solution Precursor Plasma spraying (SPPS)). For instance, the chemical barrier coating 114 is polycrystalline (as opposed to a columnar coating formed via EBPVD that has single crystalline columns), has an equiaxed microstructure with grain size of about 2 μm without any splats (as opposed to a APS coating formed from splatted particles), without any vertical boundaries that are substantially oriented perpendicular to the surface 115 (as opposed to SPS, SPPS and high-temperature/velocity) and has porosity, as deposited, greater than 20% by volume of the chemical barrier coating 114. Such a chemical barrier coating 114 can be formed to any suitable porosity (e.g., a porosity of about 20% to about 50% by volume, as deposited).

The thickness of chemical barrier coating 114 may depend upon the substrate or the component on which it is deposited. In one embodiment, the chemical barrier coating 114 has a thickness that is greater than the surface roughness of the underlying the thermal barrier coating 110, such that the chemical barrier coating 114 covers all of the surface 111. For example, the surface roughness of the thermal barrier coating 110 is about 1 μm to about 10 μm, in particular embodiments, and the chemical barrier coating has a thickness that is greater than the surface roughness of the thermal barrier coating 110 (e.g., the chemical barrier coating 114 can be about 10 μm to about 50 μm).

The thickness of chemical barrier coating 114 may also depend upon the thickness of the underlying thermal barrier coating 110 and/or layer 112 of environmental contaminant compositions. The chemical barrier coating 114 can be formed by a single application of a layer, or via multiple layers applied onto each other. In some embodiments, the chemical barrier coating 114 is about 2 times to about 8 times thicker than the layer 112 of environmental contaminant compositions (i.e., the layer 112 of environmental contaminant compositions has a thickness that is about ½ to about ⅛$^{th}$ of the thickness of the chemical barrier coating 114) to provide sufficient material to react with the existing environmental contaminant compositions and to serve as a protective coating for future deposits. However, in particular embodiments, the layer 112 and the chemical barrier coating 114 are not thicker than about 250 μm due to the possibility that layers over about 250 μm thick are more prone to spalling. As such, in certain embodiments, when the layer 112 of environmental contaminant compositions has a thickness of about about 25 μm to about 250 μm, the chemical barrier coating 114 may have a thickness of about 50 μm to about 250 μm, with the chemical barrier coating 114 being thicker than the layer 112 of environmental contaminant compositions.

In particular embodiments, the chemical barrier coating 114 is a continuous coating that covers substantially all of the surface 113 of the layer 112 so as to avoid exposure of any particular area on the surface 113 to additional CMAS attack.

In one embodiment, the chemical barrier coating 114 and the layer 112 of environmental contaminant compositions form, after continued operation of the engine, a protective layer 120 is formed on the TBC layer 110. The protective layer 120 has a fusion temperature that is greater than the fusion temperature of the environmental contaminant compositions in the layer 112. For example, the protective layer 120 has a fusion temperature that is about 0.1% to about 25% greater than the environmental contaminant compositions of layer 112 prior to formation of the protective layer 120, such as about a fusion temperature that is about 0.5% to about 10% greater.

After returning to service with the chemical barrier coating 114 thereon, a second layer 300 of environmental contaminant compositions is formed on the exposed surface 115 of the chemical barrier coating 114. The protective agents of the chemical barrier coating 114 can react with the environmental contaminant compositions of the second layer 300 to continued to form a solid crystalline product. Thus, after continued use, the layer 112 of environmental contaminant compositions, the chemical barrier coating 114, and the second layer 300 of environmental contaminant compositions can form an external barrier 302 on the surface of the TBC 110.

Since CMAS attack is a continuous process during use of the component 100, the chemical barrier coating 114 would be a consumable coating requiring refreshing. The refresh frequency depends on several conditions, such as the amount of CMAS in the layer 112, the amount of future deposits on the chemical barrier coating 114, the length of service of the component, etc.

As stated, the chemical barrier coating 114 is particularly useful on a hot path component's surface within a turbine engine. For example, the coated component 100 can be utilized in turbomachinery in general, including a high by-pass turbofan jet engine ("turbofan"), turbojet, turboprop and turboshaft gas turbine engines, including industrial and marine gas turbine engines and auxiliary power units. For example, the coated component 100 can be in the hot gas path, such as within a compressor section (e.g., compressor vanes and/or blades), a combustion section (combustion liners), a turbine section (e.g., turbine nozzles and/or blades).

Example 1

An experiment was performed on a TBC coating to determine the ability of a chemical barrier coating to extend the working life of the TBC coating. A porous-APS 8YSZ substrate was used in this example, for 4 different samples plus a baseline (i.e., no coating applied) as a control sample. A layer of CMAS was adhered onto the surface of the substrate by heat treatment to 2100° F. without allowing infiltration of the CMAS into the substrate. The adherence of the CMAS layer to the substrate was tested by air blasting the surface at about 80-90 psi.

A chemical barrier precursor suspension/slurry was prepared from crystalline ceramic particles that are nominally less than about 2 μm in diameter dispersed in alcohol. Alcohol is a carrier that is used to deliver the ceramic particles to the target area of the component, and dries during the spray process. Other liquid carriers can be used, such as water, etc. The mass concentration of the ceramic particles can be anywhere up to about 50% i.e., for every 50 g of ceramic powder, there is about 50 g of alcohol. In this example, 20 g of ceramic particles was used in 80 g of denatured ethanol.

A chemical barrier coating was formed by spraying the chemical barrier precursor suspension onto the CMAS layer to a thickness of about 0.5 mils. During the spraying process of the precursor suspension, 5 parameters were controlled: the slurry dispensing rate was 4-8 cc/min; the number of passes was 10-15; the spray velocity about 2-5 cm/sec; the air flow rate was about 65-100 SCFH; and the slurry concentration was 10-50 wt %. In this example, these parameters were a 20 wt % slurry, 6 cc/min slurry flow, 95 SCFH air flow, and 4 cm/sec spray rate for 11 passes.

The sprayed samples were tested to evaluate their ability to withstand multiple thermal shocks at temperatures that would be experienced in the turbine section of aircraft turbomachinery. The results showed that the samples with the chemical barrier coating survived significantly better than the control sample without any coating.

Example 2

An experiment was performed on a TBC coating to determine the ability of a chemical barrier coating to extend the working life of the TBC, even after CMAS infiltration into the surface. A porous-APS 8YSZ substrate was used in this example, for 3 different samples plus a baseline (i.e., no coating applied) as a control sample. A layer of CMAS was applied to the surface of the substrate and infiltrated into the surface via a thermal cycle.

After infiltrating the CMAS, a chemical barrier precursor suspension was prepared as in Example 1, and chemical barrier coating was formed by spraying the chemical barrier precursor suspension onto the CMAS layer to a thickness of about 0.5 mils as in Example 1.

The sprayed samples were tested to evaluate their ability to withstand multiple thermal shocks at temperatures that would be experienced in the turbine section of aircraft turbomachinery. The results showed that the samples with the chemical barrier coating survived significantly better than the control sample without any coating.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component of a gas turbine engine, comprising: a substrate defining a surface; a thermal barrier coating on the surface of the substrate; a layer of environmental contaminant compositions on the thermal barrier coating in response to an initial exposure of the component to high operating temperatures of the gas turbine engine; and a chemical barrier coating on the layer of environmental contaminant compositions, wherein the chemical barrier coating includes a reactive material that reacts with the layer of environmental contaminant compositions in response to a secondary exposure of the component to high operating temperatures of the gas turbine engine to form a protective layer.

2. The coated component of claim 1, wherein the layer of environmental contaminant compositions comprises CMAS.

3. The coated component of claim 1, wherein the chemical barrier coating is applied directly on the layer of environmental contaminant compositions.

4. The coated component of claim 1, wherein the thermal barrier coating defines a surface having a surface roughness.

5. The coated component of claim 4, wherein the surface roughness of the thermal barrier coating is about 1 μm to about 10 μm.

6. The coated component of claim 4, wherein the chemical barrier coating has a thickness that is greater than the surface roughness of the thermal barrier coating such that the chemical barrier coating completely coats the combined surface of the thermal barrier coating and the environmental contaminant composition and fills crevasses and valleys defined in the thermal barrier coating.

7. The coated component of claim 6, wherein the thickness of the chemical barrier coating is about 10 μm to about 50 μm.

8. The coated component of claim 1, wherein the chemical barrier coating comprises a protective agent, wherein the protective agent comprises a ceramic oxide that includes alumina, a rare-earth element, or a mixture thereof.

9. The coated component of claim 1, further comprising:
a bond coating positioned on the surface of the substrate between the metal substrate and the thermal barrier coating.

10. The coated component of claim 1, wherein the coated component is in a hot gas path of a gas turbine engine, and wherein the chemical barrier coating and the layer of environmental contaminant compositions form, after operation of the gas turbine engine, the protective layer having a fusion temperature that is greater than a fusion temperature of the environmental contaminant compositions.

11. A method of operating a gas turbine engine that includes the coated component of claim 1, the method comprising:
operating the engine to cause reaction between the layer of environmental contaminant compositions and the reactive material of the chemical barrier coating.

12. The method of claim 11, wherein a second layer of environmental contaminant compositions forms on the chemical barrier coating after operating the engine.

13. The method of claim 12, wherein the second layer of environmental contaminant compositions reacts with the chemical barrier coating.

14. A method of refreshing a thermal barrier coating having a layer of environmental contaminant compositions thereon, where the thermal barrier coating is on a surface of a substrate of a coated component of a gas turbine engine, the method comprising: applying a reactive material directly onto the layer of environmental contaminant compositions on the thermal barrier coating, wherein the reactive material reacts with the layer of environmental contaminant compositions in response to a secondary exposure of the component to high operating temperature of the gas turbine engine to form a chemical barrier coating.

15. The method of claim 14, wherein applying the chemical barrier coating directly on the layer of environmental contaminant compositions comprises:
applying a plurality of layers of the reactive material onto the layer of environmental contaminant compositions.

16. The method of claim 14, wherein the reactive material is sprayed onto the layer of environmental contaminant compositions.

17. The method of claim 14, wherein the thermal barrier coating has a surface roughness, and wherein the reactive material is applied to form the chemical barrier coating having a thickness that is greater than the surface roughness of the thermal barrier coating such that the chemical barrier coating completely coats the combined surface of the thermal barrier coating and the environmental contaminant composition and fills crevasses and valleys defined in the thermal barrier coating.

18. The method of claim 17, wherein the surface roughness is about 1 μm to about 10 μm, and wherein the reactive material is applied to form the chemical barrier coating having a thickness of about 10 μm to about 50 μm.

19. The method of claim 14, wherein the chemical barrier coating comprises a protective agent, wherein the protective agent comprises a ceramic oxide that includes alumina, a rare-earth element, or a mixture thereof.

20. The method of claim 14, wherein the substrate is a component of a turbine engine, and wherein the surface of the substrate is within a hot gas path of the turbine engine, and wherein the reactive material is applied directly onto the layer of environmental contaminant compositions on the thermal barrier coating while the component is in the turbine engine.

* * * * *